(12) United States Patent
Fesshaie et al.

(10) Patent No.: US 11,686,596 B2
(45) Date of Patent: Jun. 27, 2023

(54) WAVEGUIDE FOR PROPAGATION VELOCITY COMPENSATED POSITION MEASUREMENT MAGNETIC SENSOR

(71) Applicant: Littelfuse, Inc., Chicago, IL (US)

(72) Inventors: Efrem Fesshaie, Brundall (GB); Paulius Kabisius, Kaunas (LT)

(73) Assignee: Littelfuse, Inc., Chicago, IL (US)

( * ) Notice: Subject to any disclaimer, the term of this patent is extended or adjusted under 35 U.S.C. 154(b) by 165 days.

(21) Appl. No.: 17/208,053

(22) Filed: Mar. 22, 2021

(65) Prior Publication Data
US 2022/0299342 A1 Sep. 22, 2022

(51) Int. Cl.
*G01D 5/12* (2006.01)
*H01P 3/02* (2006.01)

(52) U.S. Cl.
CPC ............... *G01D 5/12* (2013.01); *H01P 3/02* (2013.01)

(58) Field of Classification Search
CPC ............ G01D 5/12; G01D 5/125; G01D 5/14; G01D 5/142; G01D 5/2006; G01D 5/48; H01P 3/02; G01B 7/003
See application file for complete search history.

(56) References Cited

U.S. PATENT DOCUMENTS

| 10,480,960 B2 | 11/2019 | Fesshaie | |
| 2013/0038323 A1* | 2/2013 | Honkura | G01R 33/18 324/244 |
| 2014/0306721 A1 | 10/2014 | Fesshaie et al. | |
| 2015/0211888 A1* | 7/2015 | Johnson | G01D 5/48 324/207.13 |
| 2019/0310125 A1 | 10/2019 | Farmanyan et al. | |

FOREIGN PATENT DOCUMENTS

EP 2698612 A2 2/2014
WO WO-2021157870 A1 * 8/2021

OTHER PUBLICATIONS

Littelfuse et al, "Littelfuse Pulsed WaveGuide Continuous Linear Sensor," Jun. 25, 2018, XP055941380, URL:Https://www.youtube.com/watch?v=U5bUacx6shg.

* cited by examiner

*Primary Examiner* — Son T Le
(74) *Attorney, Agent, or Firm* — KDW Firm PLLC

(57) ABSTRACT

Provided are waveguide sensors and position sensing systems. In some embodiments, a position sensing system may include a waveguide configured to receive and transmit a pulse, and a magnet moveable relative to the waveguide. The waveguide may include a first core layer and a second core layer, a magnetic layer between the first and second core layers, and a conductive winding around the first core layer, the second core layer, and the magnetic layer. The position sensing system may further include a first substrate layer above the conductive winding and a second substrate layer below the conductive winding.

19 Claims, 8 Drawing Sheets

WAVEGUIDE FOR PROPAGATION VELOCITY COMPENSATED POSITION MEASUREMENT MAGNETIC SENSOR

FIELD OF THE DISCLOSURE

Embodiments of the present disclosure relate generally to waveguide based position sensors and, more particularly, to pulsed waveguides including a PCB-based stack.

BACKGROUND OF THE DISCLOSURE

A conventional position measurement system 100 is shown in FIG. 1. The system 1 includes a sensor 10, a pulse generator 20, and a signal receiver 24. The sensor 10 includes a waveguide 12 and a magnet 14. In general, the magnet 14 is attached to a moveable object. During operation, the pulse generator 20 generates a pulse 21 that is communicated to the waveguide 12. The magnet 14 creates an impedance discontinuity 11 in a region of the waveguide 12 proximate to the magnet 14. A reflection of the pulse 21 is reflected from the point of impedance discontinuity 11, resulting in reflected pulse 23. The signal receiver 24 receives the pulse 21 and the reflected pulse 23. The position of the magnet 14 relative to the waveguide 12 can be determined based on the timing of the pulse 21 with respect to the reflected pulse 23. More specifically, the difference between the time the pulse 21 is received and the time the reflected pulse 23 is received can be used to determine the position of the magnet 14.

However, current production method of pulsed waveguides requires complex process steps, which incur high capital investment, tight manufacturing process control, and direct labour involvement. As a result, consistency of quality is often compromised.

It is with respect to the above that the present disclosure is provided.

SUMMARY

In some embodiments, a position sensing system may include a waveguide configured to receive and transmit a pulse, and a magnet moveable relative to the waveguide. The waveguide may include a first core layer and a second core layer, a magnetic layer between the first and second core layers, and a conductive winding around the first core layer, the second core layer, and the magnetic layer. The position sensing system may further include a first substrate layer above the winding and a second substrate layer below the winding.

In some embodiments, a position sensing system may include a waveguide configured to receive and transmit a pulse, the waveguide configured as a stack of layers, and a magnet moveable relative to the waveguide. The stack of layers of the waveguide may include a first core layer and a second core layer, a magnetic layer between the first and second core layers, and a conductive winding around the first core layer, the second core layer, and the magnetic layer. The position sensing system may further include a first substrate layer above the winding and a second substrate layer below the winding.

In some embodiments, a waveguide for receiving and transmitting a pulse may include a first core layer and a second core layer, and a magnetic layer between the first and second core layers, the magnetic layer embedded within an insulative material. The waveguide may further include a conductive winding around the first core layer, the second core layer, and the magnetic layer, and a first substrate layer above the winding and a second substrate layer below the winding.

BRIEF DESCRIPTION OF THE DRAWINGS

The accompanying drawings illustrate exemplary approaches of the disclosure, including the practical application of the principles thereof, and in which.

Figure 1:
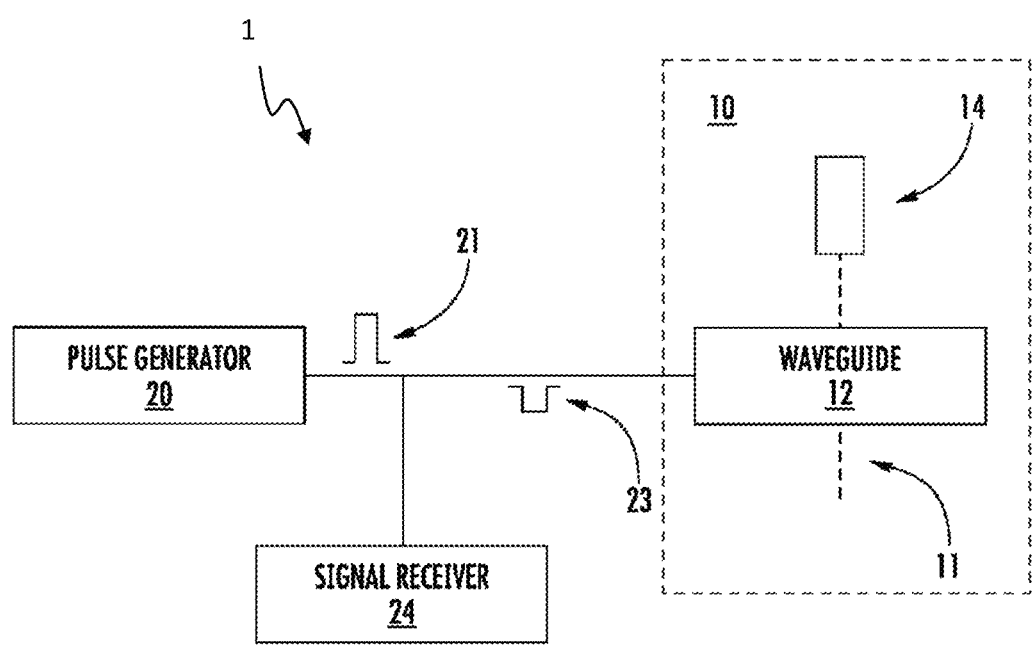
FIG. 1 shows a block diagram of a prior art positioning sensing system.

The drawings are not necessarily to scale. The drawings are merely representations, not intended to portray specific parameters of the disclosure. The drawings are intended to depict typical embodiments of the disclosure, and therefore should not be considered as limiting in scope. In the drawings, like numbering represents like elements.

Furthermore, certain elements in some of the figures may be omitted, or illustrated not-to-scale, for illustrative clarity. Cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

Position sensing systems and waveguides in accordance with the present disclosure will now be described more fully hereinafter with reference to the accompanying drawings, in which embodiments of the position sensing systems and waveguides are shown. The position sensing systems and waveguides, however, may be embodied in many different forms and should not be construed as being limited to the embodiments set forth herein. Rather, these embodiments are provided so that this disclosure will be thorough and complete, and will fully convey the scope of the system and method to those skilled in the art.

The present disclosure describes multiple example embodiments of propagation velocity compensated position systems sensors including a PCB-based pulsed waveguide (PWG). In general, these examples are PWG position sensors that incorporate the waveguide and a magnet. In some embodiments, the present disclosure provides compensation by measuring both a reflected pulse and an end of line pulse. It is noted that the example sensors detailed herein may be implemented in a variety of different systems, such as, for example, fluid level systems, gearboxes, welding machines, robotic systems, or the like. Examples, however, are not to be limited in this context. Additionally, the present disclosure may be implemented to compensate for variations in propagation velocity due to temperature, external magnetic fields, manufacturing tolerances, changes in the characteristic response of the waveguide due to the age of the waveguide, or the like. However, this is not intended to be limiting.

Figure 2:
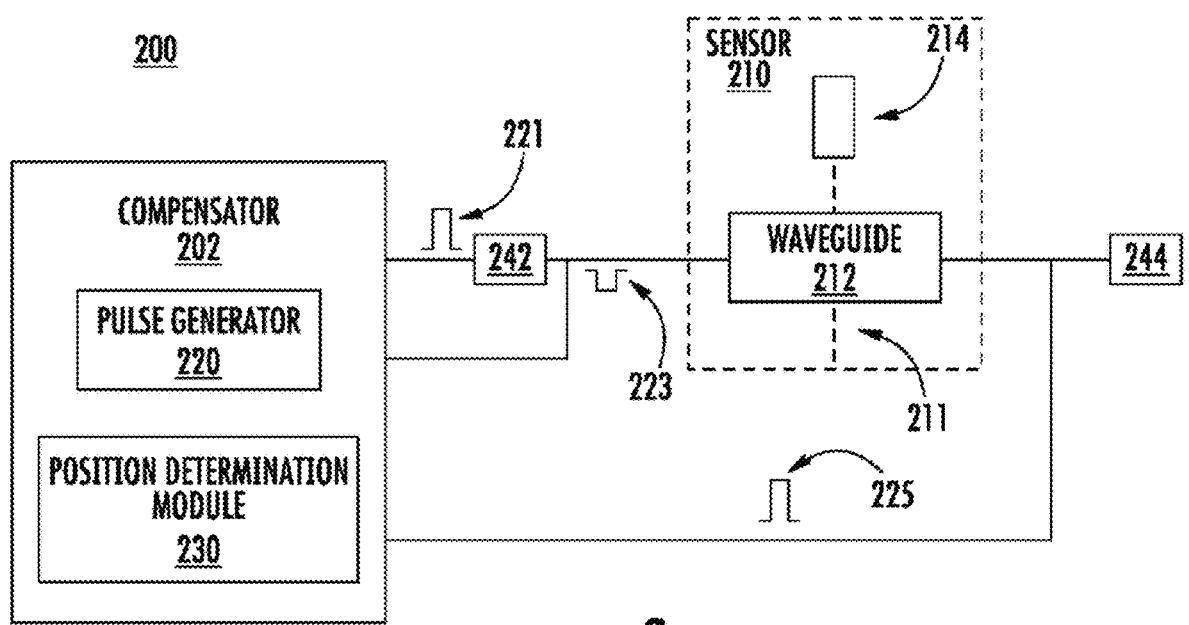
FIG. 2 is a block diagram illustrating a position sensing system according to embodiments of the present disclosure.

FIG. 2 illustrates a block diagram of a position sensing system 200, arranged in accordance with at least some embodiments of the present disclosure. The system 200 includes a position sensor 210 (sometimes referred to herein as the "sensor") comprising a waveguide 212 and a magnet 214. In some embodiments, the waveguide 212 is a PWG. In other embodiments, the waveguide 212 may be, e.g., a microstrip waveguide, a stripline waveguide, a rectangular waveguide, or the like). Additionally, the magnet 214 may be any of a variety of types of magnets (e.g., a permanent magnet, an electromagnet, or the like). The magnet 214 is movable relative to the waveguide 212. In general, the magnet 214 creates a point of impedance discontinuity 211 in the waveguide 212. The impedance discontinuity 211 is created at the location of the magnet 214 relative to the waveguide 212. The location of the waveguide 212 relative to the magnet 214 can be determined based on an initial pulse (e.g., 221), a reflected pulse (e.g., 223), and an end of line pulse (e.g., 225). In particular, this position may be determined irrespective of the propagation velocity of waves within the waveguide 212.

In practice, either the magnet 214 or the waveguide 212 may be attached to a moveable object whose position is to be determined. For example, in some embodiments, the magnet 214 can be affixed to a movable object (e.g., a sewing head, a laser, a welding tip, a liquid float, or the like). The waveguide 212 can be affixed to a cooperating structure that may be placed along the path of the moveable object. As another example, in some embodiments, the waveguide 212 can be affixed to a movable object while the magnet 214 is affixed to a cooperating structure. Accordingly, during operation, as the moveable object moves, its position relative to the cooperating structure can be determined based on determining the location of the waveguide 212 relative to the magnet 214.

In order to determine the location of the waveguide 212 relative to the magnet 214, the system 200 may include a compensator 202 having a pulse generator 220 and a position determination module 230. The pulse generator 220 and the position determination module 230 are operatively connected to the waveguide 212 (e.g., via electrical connection, or the like). The pulse generator 220 may be configured to generate signal pulses (e.g., pulse 221), wherein the pulse 221 is communicated to the waveguide 212 and reflected at the point of impedance discontinuity 211, resulting in reflected pulse 223. Additionally, the pulse 221 is transmitted through the waveguide and exits the waveguide 212 as an end of line pulse 225. The compensator 202 is configured to determine the position of the waveguide 212 relative to the magnet 214 based on the pulse 221, the reflected pulse 223, and the end of line pulse 225. In some examples, the compensator 202 may be configured to determine the position of the waveguide 212 relative to the magnet 214 based at least in part by controlling the timing of the pulse 221, e.g., by controlling the period for a series of pulses 221. With some examples, the compensator 202 may be configured to determine the position of the waveguide 212 relative to the magnet 214 based at least in part by comparing the time between the pulse 221 and the end of line pulse 225 to the reflected pulse 223.

In some examples, the system 200 may be configured to determine the position of the waveguide 212 relative to the magnet 214 in part by controlling the timing of the pulse 221. For example, the period between pulses 221 may be controlled to compensate for temperature dependence of the time between the pulse 221 being communicated to the waveguide 212 and the reflected pulse 223 exiting the waveguide 212.

Figure 3:
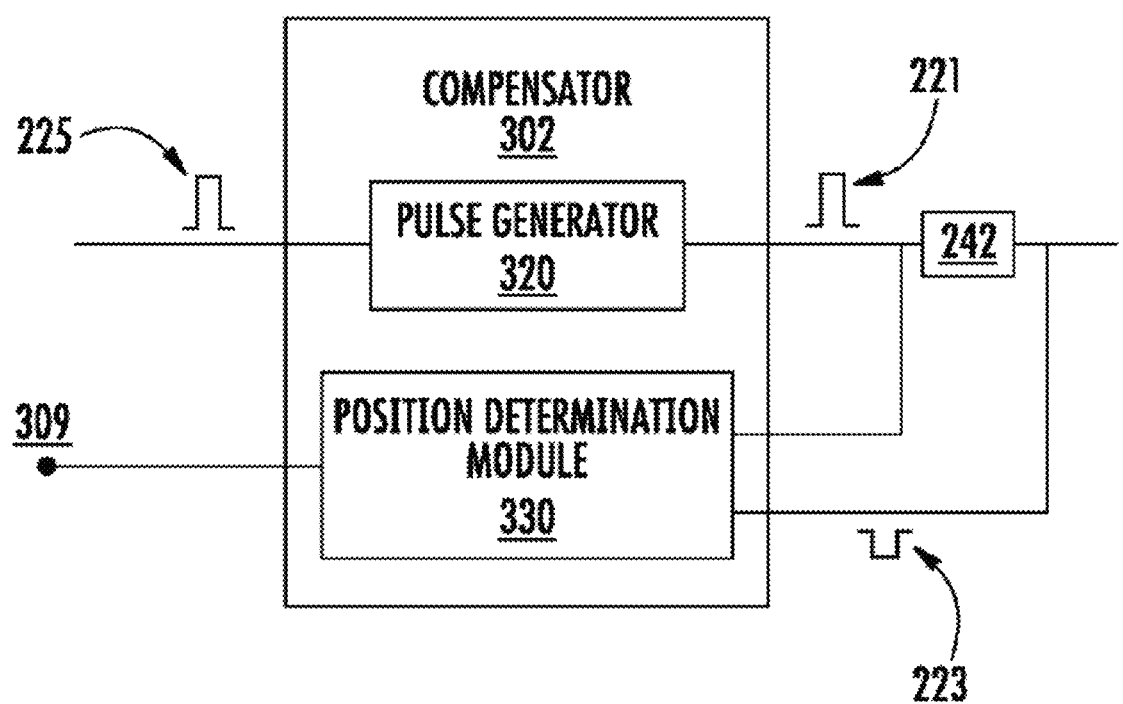
FIG. 3 is a block diagram illustrating a portion of the position sensing system of FIG. 2 in greater detail, according to embodiments of the present disclosure.

FIG. 3 illustrates a block diagram of an example implementation of a compensator 302. Although non-limiting, the compensator 302 may be implemented as the compensator 202 in the system 200 of FIG. 2. The compensator 302 may include a pulse generator 320 and a position determination module 330. As depicted, the pulse generator 320 is operably connected to the waveguide 212 to both communicate the pulse 221 to the waveguide and receive the end of line pulse 225 from the waveguide 212. Additionally, the position determination module 330 is operably connected to both the pulse generator 320 and the waveguide 212 to receive the pulse 221 and the reflected pulse 223.

The pulse generator 320 may be configured to generate a series of pulses 221 where the period (e.g., the time between pulses 221) corresponds to the time between the pulse 221 and the end of line pulse 225. As will be appreciated, this period may change during operation and can be dynamically updated by the pulse generator 320. Accordingly, as the temperature changes and/or the velocity of waves propagating through the waveguide 212 changes (e.g., due to temperature, or the like) the time, and correspondingly the period, will change.

Figure 4:
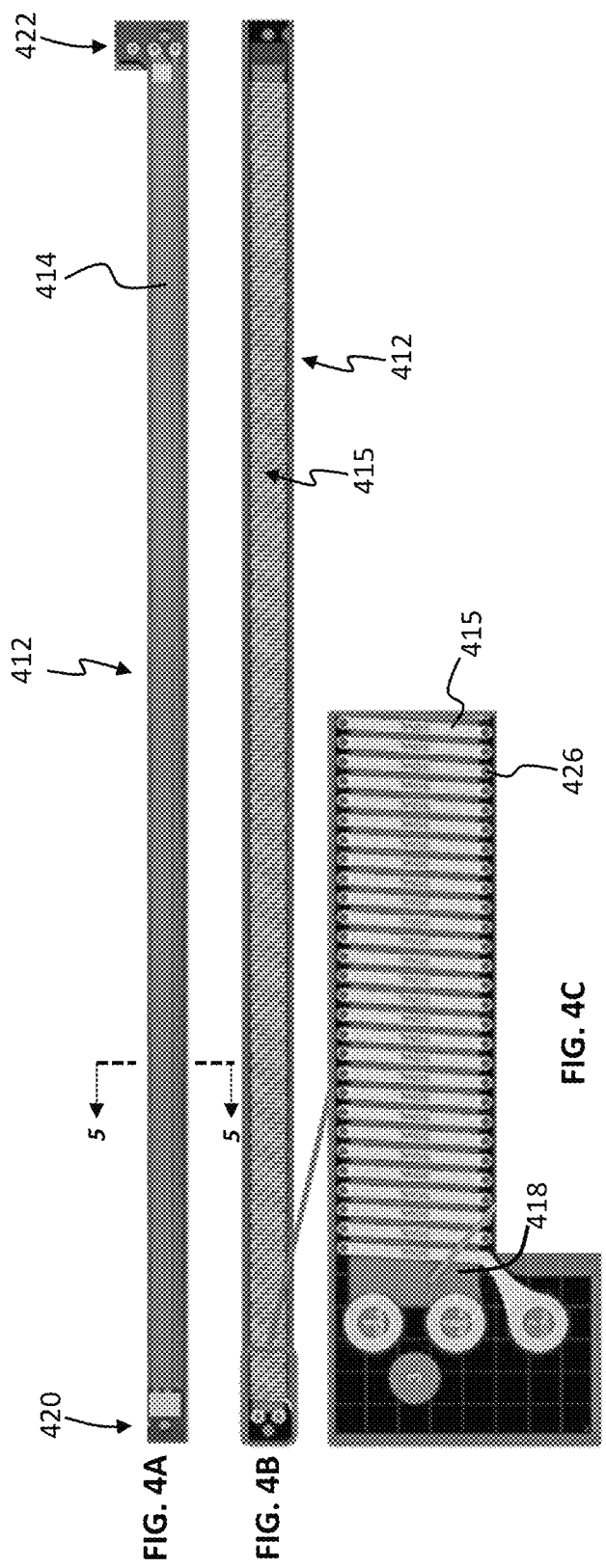
FIGS. 4A-4C are top views of a waveguide of the position sensing system, according to embodiments of the present disclosure.

FIGS. 4A-4C demonstrate a waveguide 412 according to embodiments of the present disclosure. The waveguide 412 may be part of the position sensor 210 described herein and shown in FIG. 2, wherein the waveguide 412 may be configured as a PCB layer stack-up. FIG. 4A demonstrates an exterior of the waveguide 412, including a substrate layer 414 (e.g., PCB layer). FIGS. 4B-4C demonstrate the waveguide 412 with the substrate layer 414 removed to better view a conductive winding 415 (e.g., copper) surrounding a magnetic layer 418. Although non-limiting, the magnetic layer 418 may be a ferrite strip extending between first and second ends 420, 422 (FIG. 4A) of the waveguide 412. In some embodiments, more than one magnetic layer 418 may be present. A plurality of traces 426 are aligned along outer edges of the conductive winding 415.

Although non-limiting, the substrate layer 414 may be made from epoxy or polyimide resins. In some cases, the resin may be reinforced with a woven glass cloth or other matrix such as chopped fibers. The substrate layer 414 may alternately be constructed of ceramic or rigid polymers. This listing of acceptable substrate materials is not exhaustive and other materials may also be used successfully. The materials and manufacturing techniques used to form substrates, such as PCBs, are well known to those skilled in the art.

Figure 5:
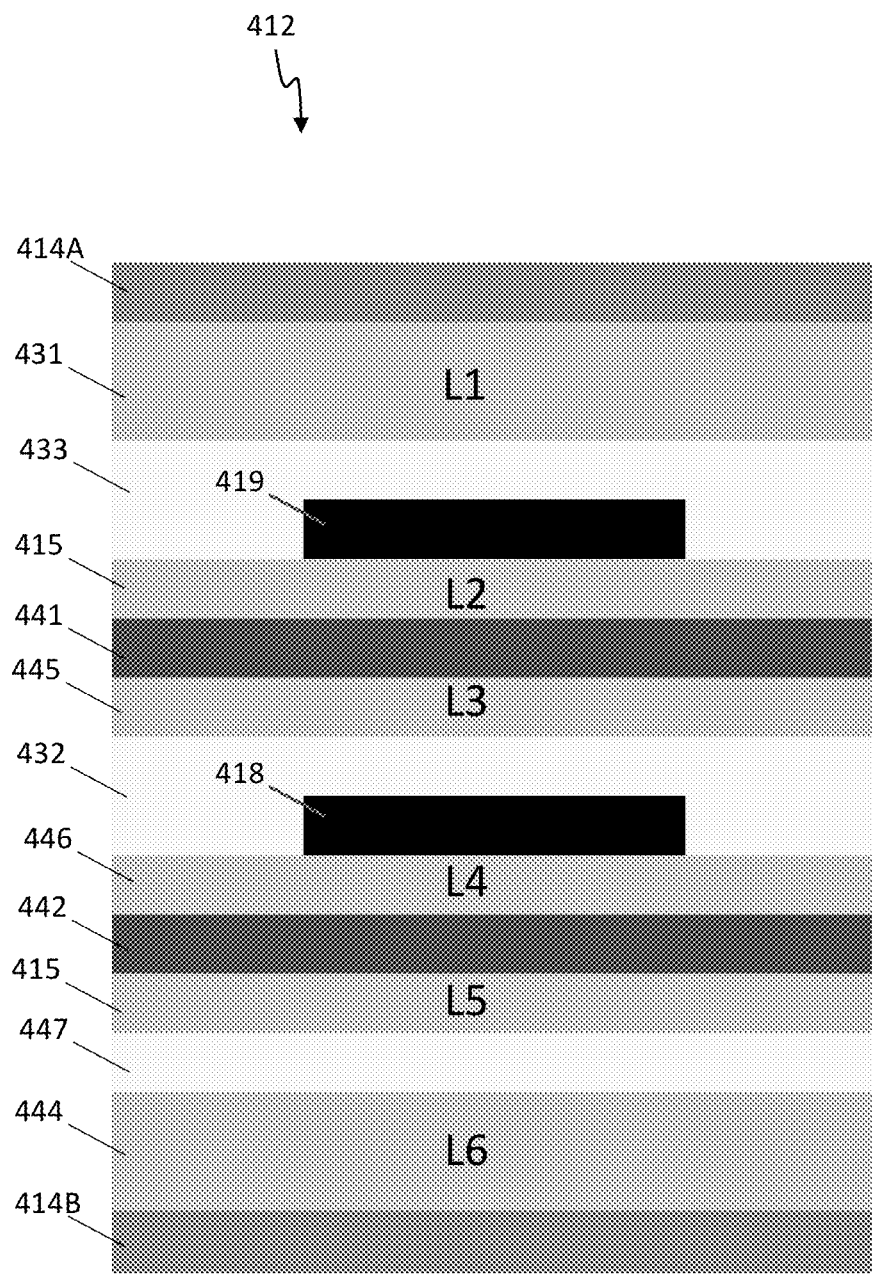
FIG. 5 is a side cross-sectional view of a stack of layers of the waveguide, taken along cutline 5-5 of FIG. 4A, according to embodiments of the present disclosure.
Figure 6:
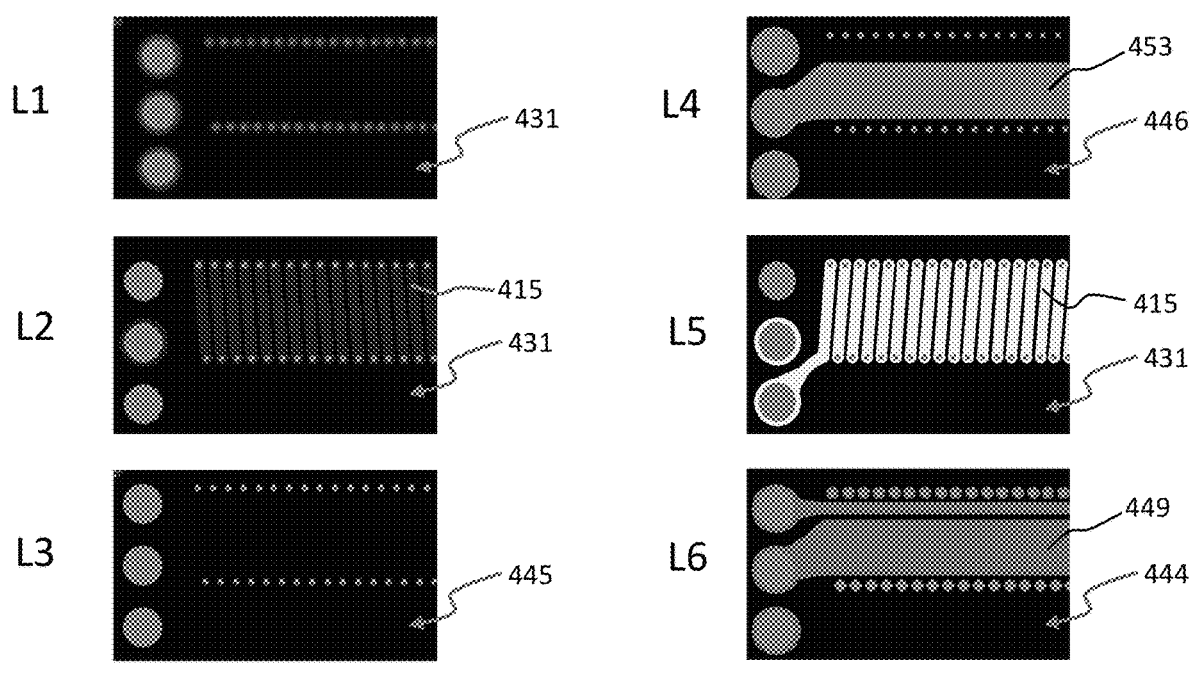
FIG. 6 demonstrates an expanded view of select layers of the waveguide, according to embodiments of the present disclosure.

Turning now to FIGS. 5-6, the waveguide 412 will be described in greater detail. As shown, the waveguide 412 may be arranged as a stack of layers (e.g., L1-L6) connected/coupled together. In some embodiments, the waveguide 412 may be enclosed by a first substrate layer 414A and a second substrate layer 414B, wherein the first substrate layer 414A is provided atop a first plating layer (L1) 431. In some embodiments, the first plating layer 431 may be a reference plane made from copper. As noted above, the first and second substrate layers 414A, 414B may be made from a PCB-type material.

As further shown, the waveguide 412 may include a first core layer 441 and a second core layer 442 surrounding the magnetic layer 418. In some embodiments, the first and second core layers 441, 442 are made from an FR-4 copperclad laminate. It will be appreciated that although only two core layers are demonstrated, more than two core layers are possible in other embodiments. The conductive winding 415 (L2 & L5) may be provided around the first core layer 441, the second core layer 442, and the magnetic layer 418. In some embodiments, the waveguide 412 may include an insulative layer 432, wherein the magnetic layer 418 is embedded within, or otherwise surrounded by, the insulative layer 432. Although non-limiting, the insulative layer 432 may be an epoxy, such as a reinforced fabric pre-impregnated with an epoxy resin. As further shown, the waveguide 412 may include a second magnetic layer 419 between the first core layer 441 and the first substrate layer 414A, wherein the second magnetic layer 419 is embedded within, or otherwise surrounded by, a second insulative layer 433 (e.g., epoxy). The second insulative layer 433 may be positioned beneath the first plating layer 431.

As further shown, a second plating layer 444 (L6) may be provided over the second substrate layer 414B, a third plating layer 445 (L3) may be provided over the insulative layer 432, and a fourth plating layer 446 (L4) may be provided over the second core layer 442. Although non-limiting, the second plating layer 444 may be a reference plane including a layer of copper 449. In some embodiments, the fourth plating layer 446 includes a grounding connection 453 for the waveguide 412. A third insulative layer (e.g., epoxy) 447 may be provided between the winding 415 and the second plating layer 444.

Figure 7A:
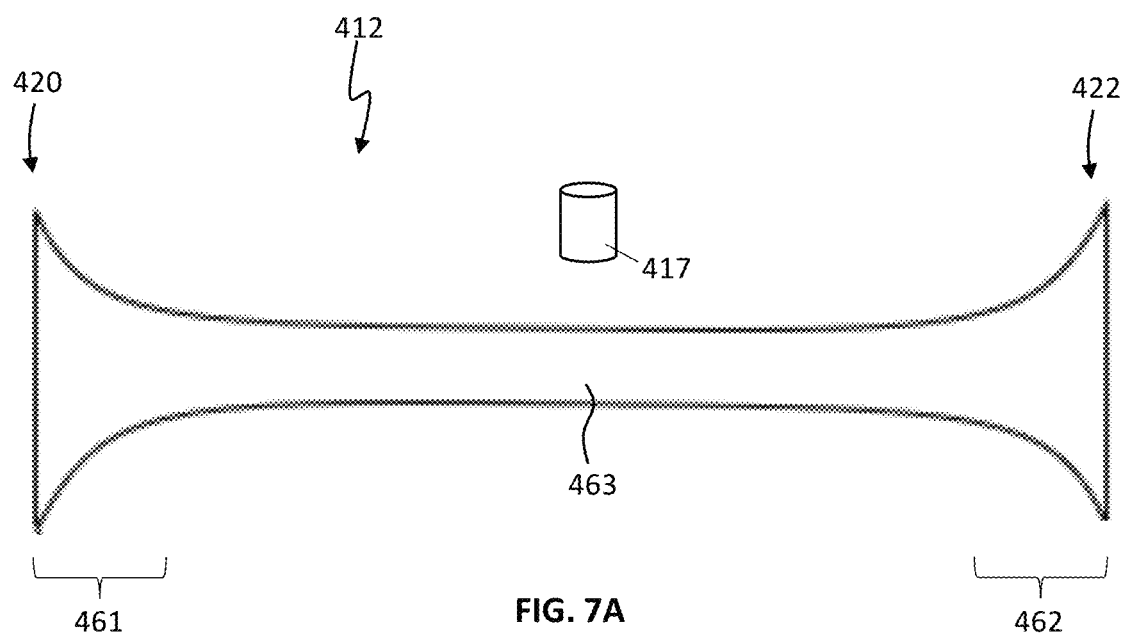
FIGS. 7A-7C demonstrate various waveguide configurations, according to embodiments of the present disclosure.

The PCB-based stack design of the waveguide 412 permits a variety of configurations. For example, as demonstrated in the top view of FIG. 7A, the waveguide 412 may be configured with one or more bell-shaped portions. More specifically, the waveguide 412 may include a first bell-shaped portion 461 at the first end 420 and a second bell-shaped portion 462 at the second end 422. In between the first and second bell-shaped portions 461, 462 is a relatively narrower central section 463. The first and second bell-shaped portions 461, 462 represent areas of delay at the start and end of a sensing process as the magnet 417 moves relative to the waveguide 412, e.g., from the first end 420 towards the second end 422. Although non-limiting, the first and second bell-shaped portions 461, 462 may be dimensioned the same or differently.

Figure 7B:
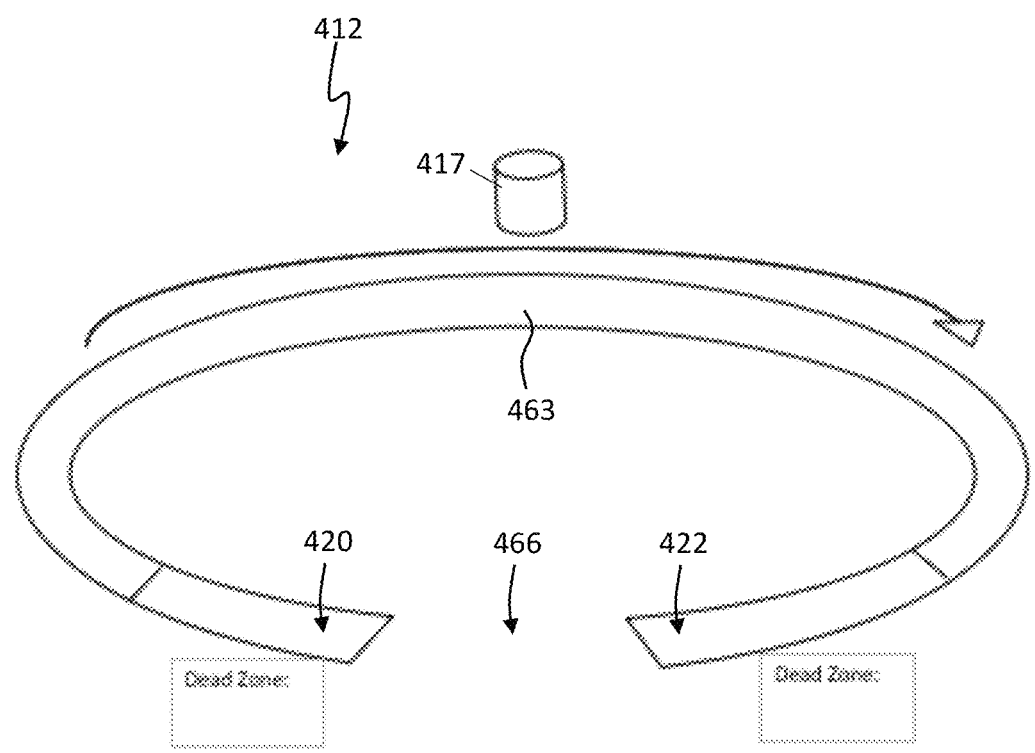
Figure 7C:
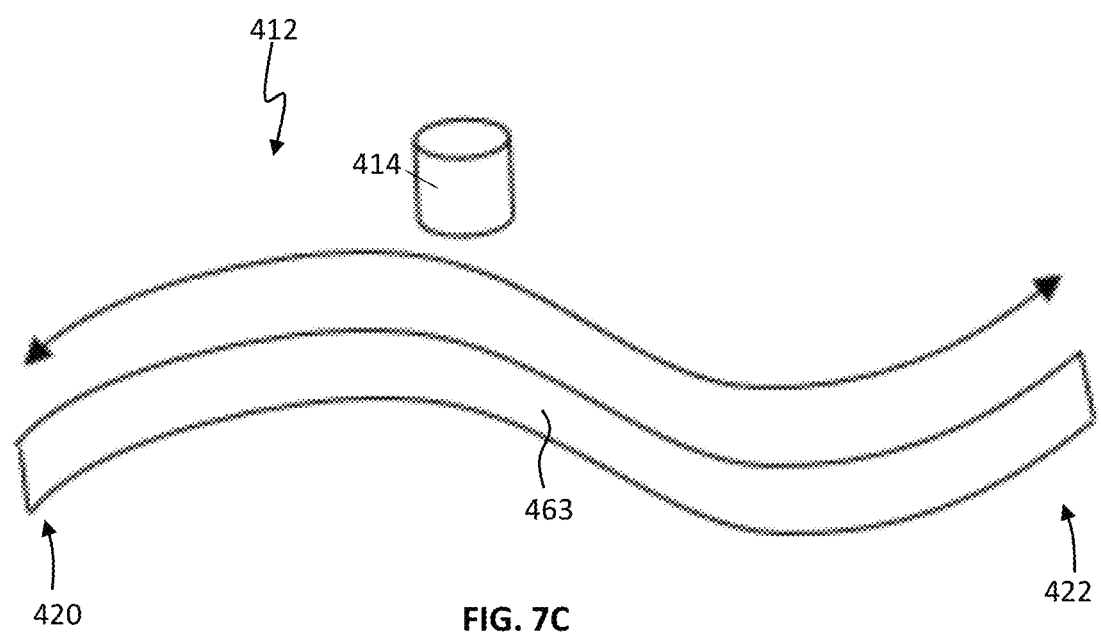

In other embodiments, as demonstrated in the side perspective view of FIG. 7B, the waveguide 412 may be configured in a semicircle or horseshoe shape. More specifically, the waveguide 412 may include the first end 420 facing the second end 422, and spaced apart from one another by a gap 466. The central section 463 between the first and second ends 420, 422 may be curved or looped. Each of the first and second ends 420, 422 may represent a "dead zone" during the sensing process as the magnet 417 moves relative to the waveguide 412, e.g., from the first end 420 towards the second end 422. In the embodiment of FIG. 7C, the waveguide 412 may be configured as a wave including one or more convex and concave sections between the first end 420 and the second end 422. It will be appreciated that a wide variety of shapes and configurations are possible within the scope of the present disclosure.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A position sensing system, comprising:
   a waveguide configured to receive and transmit a pulse;
   a magnet moveable relative to the waveguide, wherein the waveguide comprises:
   a first core layer and a second core layer;
   a magnetic layer between the first and second core layer;
   a conductive winding around the first core layer, the second core layer, and the magnetic layer;
   a first substrate layer above the winding and a second substrate layer below the winding; and
   a first plating layer over the first core layer, wherein the first substrate layer is formed directly atop the first plating layer, wherein the first plating layer is a reference plane made from a conductive material, and wherein the first and second core layers are made from a FR-4 copper-clad laminate.

2. The position sensing system of claim 1, wherein the waveguide further comprises an epoxy layer, and wherein the magnetic layer is embedded within the epoxy layer.

3. The position sensing system of claim 2, wherein the waveguide further comprises:
   a second magnetic layer between the first core layer and the first substrate layer, wherein the second magnetic layer is embedded within a second epoxy layer;
   and second plating layer over the second substrate layer.

4. The position sensing system of claim 3, wherein the waveguide further comprises a ground layer between the second core layer and the magnetic layer.

5. The position sensing system of claim 3, wherein the waveguide further comprises a third epoxy layer between the winding and the second plating layer.

6. The position sensing system of claim 1, wherein the first and second substrate layers are each printed circuit boards.

7. The position sensing system of claim 1, wherein the waveguide is arranged as a semicircle or a wave.

8. The position sensing system of claim 1, wherein the waveguide is configured with one or more bell-shaped portions.

9. A position sensing system, comprising:
   a waveguide configured to receive and transmit a pulse, the waveguide configured as a stack of layers;
   a magnet moveable relative to the waveguide, wherein the stack of layers of the waveguide comprises:
   a first core layer and a second core layer;
   a magnetic layer between the first and second core layer;
   a conductive winding around the first core layer, the second core layer, and the magnetic layer;
   a first substrate layer above the conductive winding and a second substrate layer below the conductive winding; and
   a second magnetic layer between the first core layer and the first substrate layer.

10. The position sensing system of claim 9, wherein the stack of layers further comprises an epoxy layer, and wherein the magnetic layer is embedded within the epoxy layer.

11. The position sensing system of claim 10, wherein the second magnetic layer is embedded within a second epoxy layer, wherein the epoxy layer and the second epoxy layer are made from a reinforced fabric pre-impregnated with an epoxy resin, and wherein the stack of layers further comprises:
   a first plating layer over the second epoxy layer; and
   a second plating layer over the second substrate layer.

12. The position sensing system of claim 11, wherein the stack of layers further comprises a ground layer between the second core layer and the magnetic layer.

13. The position sensing system of claim 11, wherein the stack of layers further comprises a third epoxy layer between the winding and the second plating layer.

14. The position sensing system of claim 9, wherein the first and second substrate layers are each printed circuit boards.

15. The position sensing system of claim 9, wherein the first and second core layers are made from an FR-4 copper-clad laminate.

16. A waveguide for receiving and transmitting a pulse, the waveguide comprising:
   a first core layer and a second core layer;
   a magnetic layer between the first and second core layers, the magnetic layer embedded within an insulative material;
   a conductive winding around the first core layer, the second core layer, and the magnetic layer;
   a first substrate layer above the conductive winding and a second substrate layer below the conductive winding; and
   a first plating layer over the first core layer, wherein the first substrate layer is formed directly atop the first plating layer, wherein the first plating layer is a reference plane made from a conductive material, and wherein the first and second core layers are made from a FR-4 copper-clad laminate.

17. The waveguide of claim 16, further comprising:
   a second magnetic layer between the first core layer and the first substrate layer, wherein the second magnetic layer is embedded within a second insulative material, wherein the first and second insulative materials are a reinforced fabric pre-impregnated with an epoxy resin;
   and second plating layer over the second substrate layer.

18. The waveguide of claim 17, further comprising a ground layer between the second core layer and the magnetic layer.

19. The waveguide of claim 17, further comprising a third epoxy layer between the conductive winding and the second plating layer.

* * * * *